United States Patent [19]

Seider et al.

[11] Patent Number: 4,659,022

[45] Date of Patent: Apr. 21, 1987

[54] PRODUCTION OF SILICON CARBIDE WITH AUTOMATIC SEPARATION OF A HIGH GRADE FRACTION

[75] Inventors: Robert J. Seider, Ransomville; Philip J. Guichelaar, Williamsville; Robert O. Anderson, Akron, all of N.Y.

[73] Assignee: Kennecott Corporation, Cleveland, Ohio

[21] Appl. No.: 795,188

[22] Filed: Nov. 5, 1985

Related U.S. Application Data

[63] Continuation-in-part of Ser. No. 721,761, Apr. 14, 1985.

[51] Int. Cl.[4] .................. B02C 21/00; C01B 31/36
[52] U.S. Cl. ........................................ 241/23; 241/24; 423/345; 252/62.51; 252/62.55; 209/208; 209/3; 209/8; 209/215
[58] Field of Search ................ 209/208, 209, 2, 3, 209/8, 215; 241/23, 24; 436/72; 423/345, 346; 252/62.51 R, 62.55

[56] References Cited

U.S. PATENT DOCUMENTS

| | | |
|---|---|---|
| 492,767 | 2/1893 | Acheson . |
| 2,642,514 | 6/1953 | Herkenhoff .................. 209/215 X |
| 3,166,380 | 1/1965 | Kuhn . |
| 3,202,502 | 8/1965 | Lean et al. ...................... 241/23 X |
| 3,579,462 | 5/1971 | Clinton et al. .................. 436/72 X |
| 3,654,161 | 4/1972 | Geus ....................... 252/62.51 R X |
| 3,704,114 | 11/1972 | Wilson et al. ...................... 423/345 |
| 3,860,514 | 1/1975 | Lee et al. ............................ 209/8 |
| 3,970,546 | 7/1976 | Webb et al. .......................... 209/3 |
| 3,989,883 | 11/1976 | Wiebke et al. .................... 423/345 |
| 4,059,050 | 11/1977 | Davis, Jr. ...................... 209/215 X |
| 4,084,496 | 4/1978 | Ehernberger et al. ......... 209/215 X |
| 4,554,088 | 11/1985 | Whitehead et al. ..... 252/62.51 R X |

FOREIGN PATENT DOCUMENTS

| | | | |
|---|---|---|---|
| 238133 | 8/1910 | Fed. Rep. of Germany ...... 209/208 |
| 1196168 | 7/1965 | Fed. Rep. of Germany ...... 423/345 |
| 198575 | 5/1982 | Japan ........................... 252/62.51 R |

Primary Examiner—Robert B. Reeves
Assistant Examiner—Glenn B. Foster
Attorney, Agent, or Firm—Pahl, Lorusso & Loud

[57] ABSTRACT

Method of producing silicon carbide and of automatically separating a high grade fraction thereof using magnetic separation techniques. In the method of the invention, a silicon source, a carbon source and a ferromagnetic element source are admixed and the admixture is heated from the center outward to form a cylinder containing silicon carbide with a center to exterior temperature gradient. The ferromagnetic element migrates from the hotter center to the cooler exterior portions of the cylinder. The cylinder is cooled and crushed. The lower grade silicon carbide particles are then separated from the high grade silicon carbide crystals using magnetic separation means.

11 Claims, 4 Drawing Figures

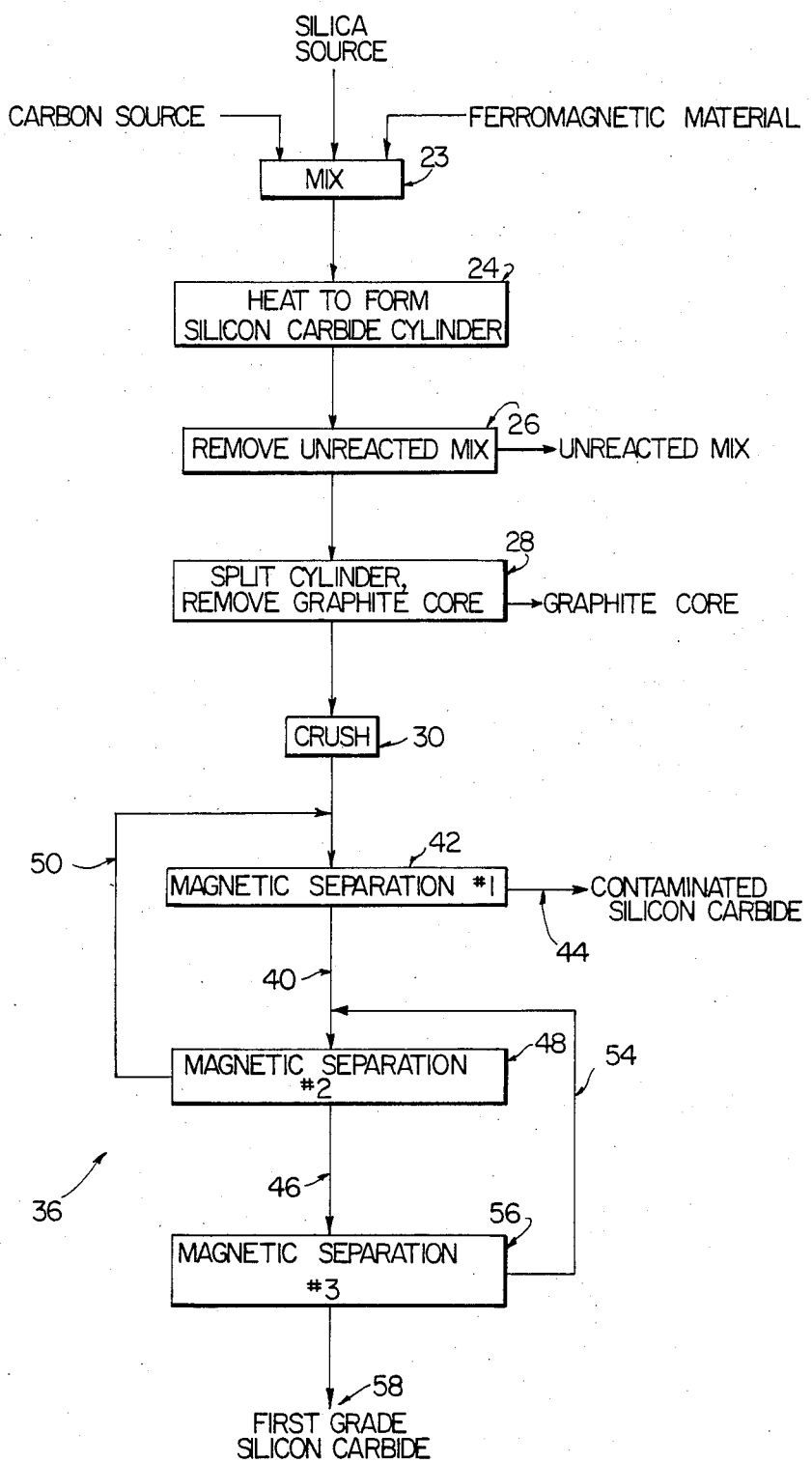

PRODUCTION OF SILICON CARBIDE WITH AUTOMATIC SEPARATION OF A HIGH GRADE FRACTION

CROSS-REFERENCE TO RELATED APPLICATION

This application is a continuation-in-part of our prior copending application entitled "AUTOMATIC METHOD FOR SEPARATING AND CLEANING SILICON CARBIDE FURNACE MATERIALS", U.S. Ser. No. 721,761, filed Apr. 14, 1985.

BACKGROUND OF THE INVENTION

This invention relates to a method for the production of silicon carbide with automatic magnetic separation of a high grade fraction.

Silicon carbide, SiC, is produced by reacting silica with carbon, usually at temperatures of approximately 2000° C., according to the following reactions:

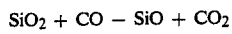
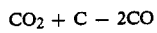

$$SiO_2 + CO \rightarrow SiO + CO_2$$

$$CO_2 + C \rightarrow 2CO$$

$$\underline{SiO + 2C \rightarrow SiC + CO}$$

$$SiO_2 + 3C \rightarrow SiC + 2CO$$

At temperatures above 2000° C., consolidation and recrystallization of gaseous sub-species of silicon carbide take place.

Commercial production of silicon carbide, in the prior art, is commonly carried out in an Acheson furnace, as shown in FIG. 1, in which an electric current is passed through the reactants to form silicon carbide. Silicon carbide has also been produced in other types of furnaces, including vertical shaft furnaces and rotary kilns, in which passing an electrical charge through the silicon carbide is not the method utilized. In these types of furnaces, the heat source may be external to the reactants. Such furnaces generally produce a less pure silicon carbide product.

The most prevalent method for making silicon carbide, today, is almost identical to that described in the 1893 Acheson patent, U.S. Pat. No. 492,767. The cross section of an Acheson-type furnace is usually trapezoidal, as illustrated in FIG. 2, or it may be semicircular. The furnace may have removable firebrick sidewalls or sections which contain the reactants. These furnace walls may be straight, curved, or tapered. Generally, the furnaces are approximately 20 to 200 feet in length, 10 to 20 feet in width, and 6 to 20 feet in height. The furnace may be straight in its length dimension or may be circular, horse-shoe shaped, or other various configurations. At each end of the furnace are rectangular or cylindrical-shaped graphite or soderberg electrodes, which are positioned near the center of the furnace head, as illustrated in FIG. 1. The furnace is charged with a mixture of approximately 45% carbon by weight, generally in the form of coke or anthracite coal, and 55% silica sand, $SiO_2$, by weight. (Throughout the specification and claims, all percentages are by weight, unless otherwise indicated.) After the furnace is half full, a core of petroleum coke and/or graphite is placed in the center, connecting the electrodes. The purpose of the graphite core is to serve as a conductor between the electrodes to generate the high temperatures necessary for the initial silicon carbide formation. Further silica sand and carbon charge is then placed over the electrode core to fill the furnace. Sawdust and coarse sand are often a part of the furnace charge to promote circulation of the reacting gases and to aid in venting the carbon monoxide gas which is formed during the reaction.

The furnace is heated by applying power to the electrodes for approximately 30 to 360 hours. The voltage required is approximately 200 to 1200 volts, and the current requirements are approximately 5000 to 65,000 amperes. The total power consumption normally ranges from 2.7 to 3.6 kwh per pound of silicon carbide product. Silicon carbide is formed by the reaction of the silica sand with the coke or graphite. This reaction first occurs around the graphite core, and then proceeds outward to eventually form a large "cylinder." As used throughout the specification and claims, the term "cylinder" refers to a silicon carbide furnace product or materials, regardless of its cross-sectional shape, e.g. circular, elliptical, etc. Moreover, the "cylinder" may come from a furnace that is, in plan view, linear, circular or horse shoe shaped. Silicon carbide is a conductor of electricity. As the mixture around the furnace core becomes converted to silicon carbide, the cylinder begins to conduct some of the electrical current, which necessitates a downward adjustment in the applied voltage to limit the power input. Some experts claim that during production of silicon carbide, the furnace temperature rises to a maximum of approximately 2500° C. at the core and then decreases to a nearly constant temperature of approximately 2040° C. Silicon carbide can form at lower temperatures, but the product is a cubic form of silicon carbide (beta silicon carbide) which is generally unsuitable for abrasives purposes because the crystals are too small. The most desirable form of silicon carbide is large crystal alpha silicon carbide (a hexagonal form of silicon carbide), which is formed from beta silicon carbide at temperatures above about 1950° C. The color of silicon carbide varies depending on the purity of the furnace reactants; higher purity reactants produce silicon carbide which tends to be more pure and light green in color, while less pure reactants produce silicon carbide which is blank in color.

As the furnace product cools, the unreacted mix is removed from the silicon carbide furnace product. The resulting furnace cylinder is approximately cylindrical or oval shaped and has three silicon carbide product zones, as illustrated in FIG. 2:

(1) Zone 1, known in the art as #1 Black, first grade, or high grade silicon carbide, contains approximately 65% to 85% by weight of the total furnace cylinder, depending on total impurity content. This zone contains the most pure silicon carbide (approximately 95–99% SiC by weight). This zone comprises coarse crystal, non-porous silicon carbide, and is the most desirable silicon carbide product. However, at the outer layers of this zone, a significant concentration of ferromagnetic elements such as iron may be present. The first grade silicon carbide zone cylinder wall thickness is approximately 4–48 inches thick, the range being a function of furnace size, heating time and total impurity content.

(2) Zone 2, known in the art as firesand, metallurgical, or second grade silicon carbide, comprises fine crystal, porous silicon carbide agglomerated particles. This zone is approximately 10% to 25% by weight of the total furnace cylinder, and contains approximately 92% SiC by weight. This zone may contain significant quantities of ferromagnetic elements such as iron. The concentration of such iron may decrease across the layer in relation to the furnace temperature profile during firing. This layer of silicon carbide may be recycled into subsequent furnace mixes, used as an additive in iron and steelmaking, or used to produce refractories. The second grade silicon carbide zone cylinder wall thickness is approximately 2-12 inches thick.

(3) Zone 3, known in the art as the crust, comprises partially reacted particles. This zone is approximately 5% to 10% by weight of the total furnace cylinder, and contains approximately 60% SiC by weight. The crust contains a considerable amount of silicon carbide, but is unsuitable for abrasive purposes. Silicon carbide in the crust varies in concentration throughout the crust thickness, and nowhere is it well crystallized. The contaminants in the crust are high amounts of silica, calcium, carbon, aluminum and small amounts of iron. The crust zone cylinder wall thickness is approximately ½-3 inches thick.

The central core of the silicon carbide furnace cylinder is highly porous graphite (also shown in FIG. 2). Surrounding the silicon carbide crust layer is unreacted mix (also shown in FIG. 2), which can be easily separated from the cylinder and recycled. The unreacted mix may contain a substantial fraction of silicon carbide (up to 30% by weight), which will be consolidated into a cylinder if it is in the reaction zone during subsequent furnace cycles.

After the silicon carbide furnace cylinder is removed from the furnace, the outer crust of the cylinder can be scraped away from the cylinder with a hoe-type device. A hydraulic grab is generally used to split the cylinder into large sections and to expose the porous graphite core. The graphite core is removed by hand, or mechanically with a crane or vacuum device. Additional removal of graphite is accomplished by vacuuming or brushing the pieces removed from the furnace.

The silicon carbide containing zones of the furnace cylinder are not easily separated from each other. The zones are usually separated in the prior art by using hand-held pneumatic spades or jackhammers, as illustrated in FIG. 3. Typically, one person can separate 1400 tons of first grade silicon carbide per year, manually. Hand separation is strenuous, noisy and dusty, so productivity is low. The sorting of the products is done solely by visual appearance; as the sorter chisels the outer layer off a piece of the cylinder, he or she must decide how thick a layer must be removed and into which group the respective pieces must be placed. One problem with hand separation is that some of the best product (first grade silicon carbide) may be lost to the lower grades of silicon carbide product. On the other hand, some of the lower grade silicon carbide may get mixed in with the first grade silicon carbide, which may be detrimental to the end use of the first grade final product. The hand separation and sorting process is thus inefficient, time consuming, inexact, and results in high process costs due to the high amount of labor involved.

After sorting, the masses or lumps of silicon carbide materials are further crushed, washed, dried, size-classified, magnetically treated to remove iron contamination resulting from the crushing mills, and often treated with acid or alkali to improve purity.

There are other prior art methods of separating the silicon carbide furnace materials, based on mechanical, chemical and electrical properties, but these have tended to be more expensive and less reliable than hand separation. Shaking tables or air tables have been utilized to separate silicon carbide particles based on different specific gravities. However, the first grade silicon carbide crystals and agglomerate silicon carbide particles all fall within a narrow range of specific gravities of approximately 2.5-3.2 g/cm$^2$. Thus, mechanical means of separation are generally ineffective for separating silicon carbide furnace materials.

Another prior art method of separating the various silicon carbide furnace materials is the use of sink-float or heavy medium liquid techniques. Most of these high density liquids, however, are polyhalogenated materials, which are expensive, potentially hazardous, and non-biodegradable. In addition, the silicon carbide materials must generally be crushed to a very fine size and preferably subjected to an elaborate froth flotation process prior to the heavy medium liquid separation step, which are both costly steps.

Another separation technique in the prior art utilizes the electrical conductivity of the silicon carbide materials. Conductive grains of silicon can be separated from non-conductive grains (sand and non-conductive silicon carbide) by electrostatic or high tension separators. These techniques require very precise control over all operating parameters, do not produce an effective separation, and are too sensitive to utilize in a production environment. Furthermore, the non-conductive silicon carbide grains, in which impurities compensate one another electrically, would be lost the silica fraction.

Other methods for separating silicon carbide furnace materials, which have been considered in the prior art, include shot blasting or tumbling off the more friable, outer layer, or abrading off the outer layer with a wire brush or similar cutter.

SUMMARY OF THE INVENTION

This invention is a new method for producing silicon carbide with automatic, magnetic separation of the most desirable, high grade fractions. use of this method yields high quality first grade silicon carbide, along with eliminating costly and potentially hazardous processing techniques.

The high temperature achieved in the cylinder during furnacing causes an impurity distillation process whereby the impurities vaporize from the hotter central area of the cylinder and condense in the outer cooler areas of the cylinder.

The position of condensation of each impurity is dependent on the gas phase partial pressure of that element and the temperature profile in the cylinder. Impurities that vaporize at high temperatures (much higher than the furnace cylinder temperature) do not migrate. This phenomenon is shown in the data below: (The chemistry is approximate.)

| Impurities | | Concentration in Raw Materials, % | | Concentration in Cylinder Zones, % | | |
|---|---|---|---|---|---|---|
| Element | Boiling Temp °C. at 1 atm | Coke | Sand | 1 | 2 | 3 |
| V | 3380 | .05 | — | .03 | .03 | .02 |
| Ti | 3450 | .01 | .04 | .03 | .03 | .02 |
| Fe | 2750 | .02 | .20 | .15 | 1.00 | .30 |
| Al | 2450 | .01 | .20 | .08 | .80 | 3.00 |
| Ca | 1440 | .01 | .02 | .01 | .01 | 3.00 |
| Mg | 1107 | .01 | .02 | .01 | .01 | .05 |

Vanadium and titanium, which have very high boiling points, do not distill and remain constant throughout the cylinder. The Iron, with an intermediate boiling point, condenses in the outer layer of Zone 1 and in Zone 2. The aluminum and calcium, which have lower boiling points, condense in the cooler Zone 3. Magnesium, with the lowest boiling point, may escape the cylinder and condense in the old mix.

From the above table, it is evident that Iron, Aluminum and Calcium have been increased in concentration approximately 5, 15 and 150 times respectively, based on the difference of the impurities in the sand and the maximum concentration in Zones 1, 2 or 3.

An element may be distilled, retained as an in-situ metallic impurity or formed into a carbide depending on thermodynamic variables such as heat of formation, reaction rate constant, reaction temperature, rate of temperature increase at a particular location of the furnace, element vapor pressure vs. temperature and permeability of the furnace mix.

The present invention recognizes the above-described migration of "impurities," and takes advantage of the phenomenon.

The invention begins with the formation of silicon carbide, in a manner that is generally conventional except that ferromagnetic elements are deliberately added to or contained in the feed to the reaction furnace, e.g. an Acheson-type furnace. Accordingly, a silicon source (typically silica sand), a carbon source (typically anthracite coal or coke) and a ferromagnetic element source are mixed together and reacted in a furnace. In the furnace the admixture is heated to a temperature sufficient to form silicon carbide (typically 2000° C. or more). By heating the admixture from its center outward, a temperature gradient is formed whereby the ferromagnetic elements migrate from the center of the admixture toward the outer regions thereof. The operative steps and process parameters are conventional.

Within the cylinder the ferromagnetic elements volatilize at the central hotter regions (typically Zone 1 in FIG. 2) and condense in the cooler regions (typically Zones 2 and 3), thus accomplishing the above-mentioned migration. As a result the high grade material of Zone 1 may be substantially free of the ferromagnetic material and zones 2 and 3 will contain substantial amounts of iron or other ferromagnetic elements which allows magnetic separation of zones 2 and 3 material from zone 1 material.

The entire cylinder is then crushed after removing loose mix and the graphite core. Preferably the cylinder is crushed to approximately minus 3 mesh, and more preferably to minus 6 mesh, prior to employing the separation method of the invention. (As used throughout the specification and claims, mesh size or sieve size is U.S. standard size.)

The lower grade silicon carbide particles are then magnetically separated from the first grade silicon carbide crystals by magnetic separation means, common to the art. Magnetic separation is possible since the lower grade silicon carbide particles containing the condensed ferromagnetic elements are more strongly attracted to a magnetic force than the more pure first grade silicon carbide crystals. It is preferable to have several stages of magnetic separation to improve the first grade silicon carbide product recovery and quality.

Thus, the method of the present invention eliminates the hand cleaning and sorting required with conventional technology.

Accordingly, it is an object of the present invention to provide a method for the preparation and separation of first (high) grade silicon carbide fraction which is efficient, automatic, inexpensive, and eliminates most of the labor requirements associated with existing prior art methods.

It is a further object of the present invention to provide a method for the separation of silicon carbide furnace materials which yields a high recovery of first grade silicon carbide.

Yet another object of the present invention is to provide a method for producing a consistent, cleaner, and high quality, first grade silicon carbide product.

Other objects and further scope of applicability of the present invention will become apparent from the detailed description to follow, taken in conjunction with the accompanying drawing.

DESCRIPTION OF THE PREFERRED EMBODIMENT

Figure 1:
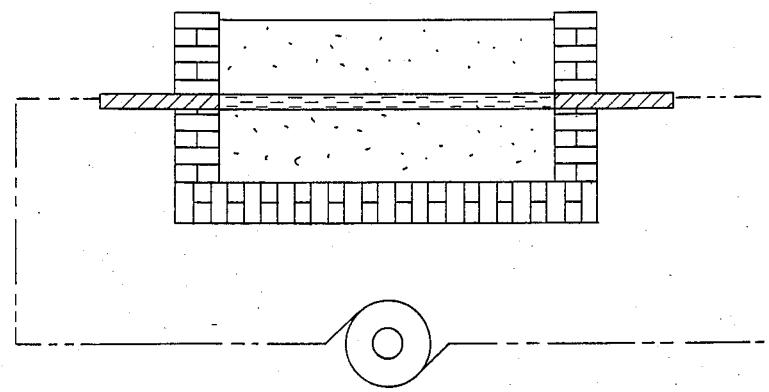
FIG. 1 is an illustration of a silicon carbide Acheson furnace with graphite electrodes positioned near the center of the furnace mix.

At the outset, the invention is described in its broadest overall aspects with a more detailed description following. The present invention begins with the addition of ferromagnetic elements to a conventional feed mix to an Acheson furnace. As previously noted, the conventional feed mix for forming silicon carbide is an admixture of a carbon source and a silicon source. The ferromagnetic elements added to this conventional feed mix include iron, nickel and cobalt and may be various compounds (e.g. oxides) or alloys of these elements. One useful magnetic powder is derived from a ferromagnetic alloy ("ferrosilicon") powder having a composition nominally 78 wt. % Fe, 15 wt. % Si, 5 wt. % Ti and 2 wt. % Al. Other useful powders are ferric oxide and ferrous oxide. Other compounds which contain iron, nickel or cobalt are also useful in the method of the invention. Ferrosilicon (100 mesh) of the above composition in amounts constituting 0.25 and 0.50 wt % of the feed mix has proven practical. Another preferred source of iron is natural sands containing high concentrations of iron. Iron borings or iron powders may also be used.

Another preferred source of iron, particularly from the viewpoint of its low cost, is red mud, a precipitate (containing aluminum, calcium and sodium in addition to iron) formed during the Bayer refining process for the production of $Al_2O_3$.

The feed particle size and blending apparatus used in the practice of the present invention are conventional. Preferably, the feed components are mixed until a uniform (homogeneous) blend is obtained but a completely uniform blend is not necessary.

The feed mix preferably contains a sufficient amount of the ferromagnetic element or elements to provide at least 0.125 wt. %, more preferably 0.25 wt. % of the ferromagnetic element or elements in the magnetically separable (low grade) fraction. For example, if the mix contains 0.1% iron and the ratio of zone 1 to zones 2 and 3 is 4 (80% zone 1, 20% zones 2 and 3) and all of the iron volatilizes from zone 1 into zones 2 and 3, zones 2 and 3 would contain an average of 0.5% iron. If the ratio was 2.33 (70% zone 1, 30% zones 2 and 3), zones 2 and 3 would contain an average of 0.333% iron. If an additional 0.1% iron was added to each of the furnace mixes above, the Fe in zones 2 and 3 would increase to 1.0 and 0.666% respectively. The volumetric ratio of zone 1 to zones 2 and 3 will vary with furnace geometry, mix impurities, and the operating parameters for the heating step.

The feed mix is then reacted using conventional apparatus and techniques. Typically, using an Acheson furnace about 40 feet long and 10 feet in diameter, the power initially impressed across the electrodes may be on the order of 300 volts at a current of 5000–6000 ampheres. As the run proceeds, the resistance of the furnace will drop and its temperature will rise so that, at the end of the run, the power required would be about 200 volts at about 20,000 ampheres. All the foregoing description of operation of the Acheson furnace is conventional.

Toward the end of the heating period the heating rate may be increased or decreased to change the pattern of condensation of the ferromagnetic elements.

Figure 2:
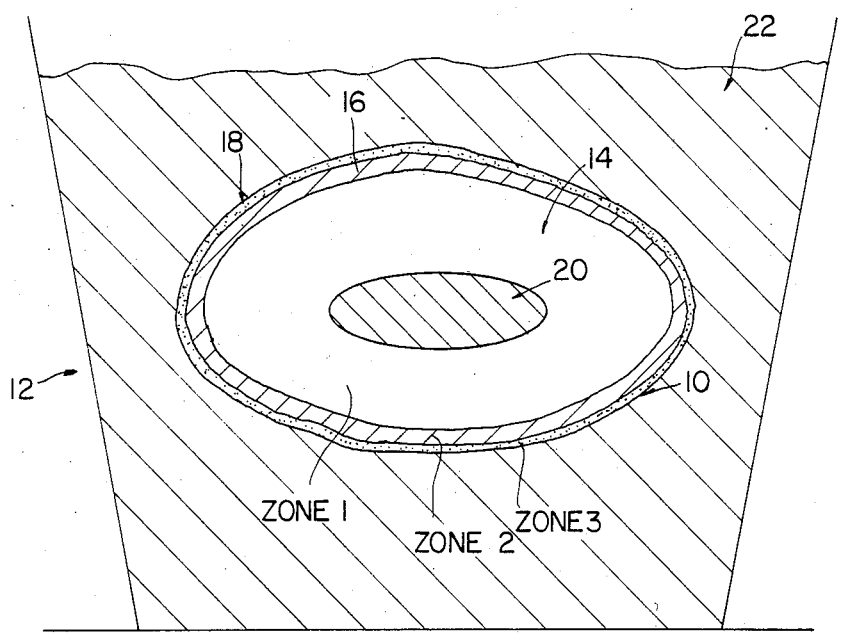
FIG. 2 is an illustration of a typical cross-section of a silicon carbide Acheson-type furnace, with the resulting furnace products.
Figure 3:
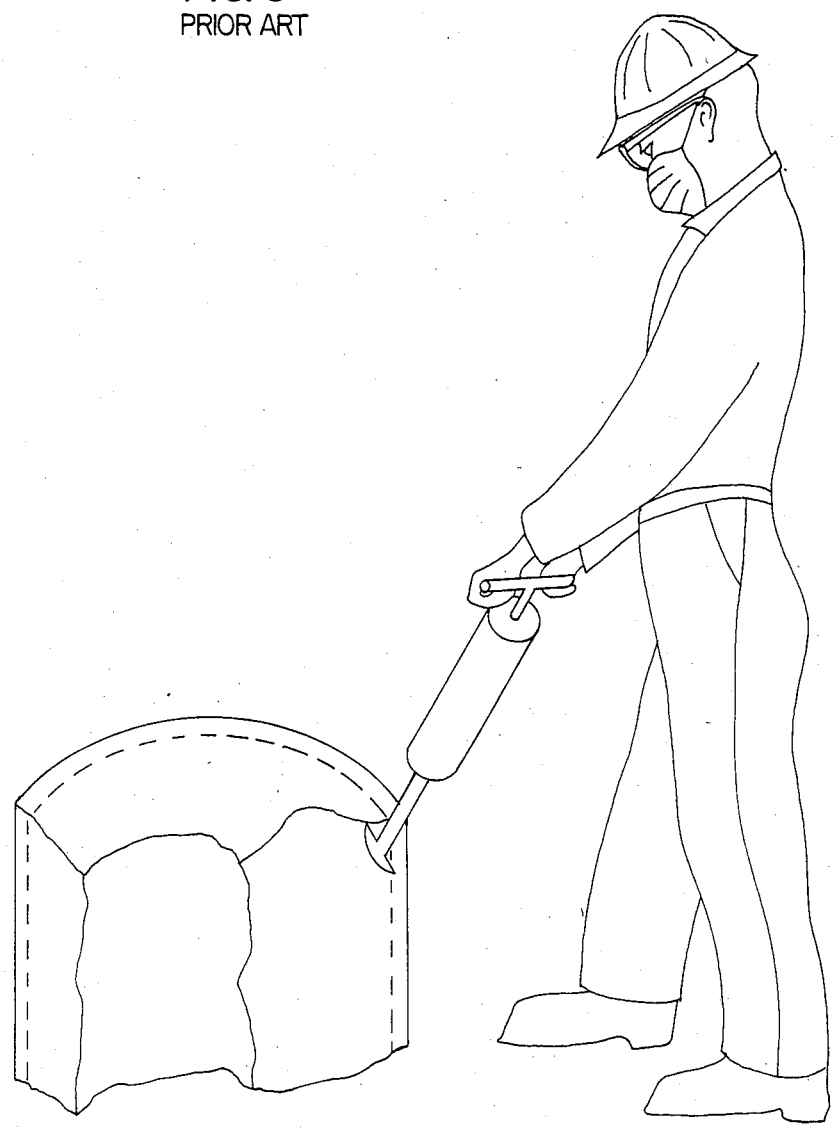
FIG. 3 is an illustration of the prior art method of separating a silicon carbide furnace product; and, FIG. 4 is a schematic representation of the preferred method of this invention.

As illustrated in FIG. 2, the crude product 10 from a silicon carbide furnace 12 is cylindrical or oval shaped. This furnace product 10 contains three silicon carbide zones:

(1) Zone 1 (14), comprises a non-porous, coarse crystal, high purity (95–99% SiC by weight) silicon carbide, known in the art as #1 Black, first grade, or high grade silicon carbide. The outer layer of this zone may contain significant concentrations of ferromagnetic elements.

(2) Zone 2 (16), comprises a porous, fine crystal, lower purity (85–95% SiC by weight) silicon carbide material as agglomerated particles, known in the art as firesand, metallurgical, or second grade silicon carbide. This zone generally contains iron or other ferromagnetic elements as a contaminant. The amount of iron may decrease towards the outer edge of the layer.

(3) Zone 3 (18), comprises porous, poorly crystallized, low purity (30–60% SiC by weight) partially reacted particles, known in the art as the crust. The contaminants in the crust are silica, calcium, carbon, aluminum and iron.

At the center of the furnace product is a highly porous graphite core 20. Surrounding the furnace product is unreacted mix 22 which may contain up to 30% silicon carbide by weight.

Prior to magnetic separation, it is necessary to obtain crushed or particulate silicon carbide materials. Crushing a silicon carbide furnace product may be accomplished by any one of a number of procedures common to the art. A jaw crusher or hammer mill is particularly useful for the first stage of crushing, since the silicon carbide furnace product may be quite large. The furnace product is crushed to approximately minus 3 mesh, and preferably to minus 6 mesh or finer.

The lower grade silicon carbide particles are separated from the first grade silicon carbide crystals by magnetic separation means, common to the art, in accordance with the invention. Operating parameters, such as belt speed and feed rate, are adjusted for proper separation of the low grade particle stream from the first grade silicon carbide particle stream. It is preferable to have at least three stages of magnetic separation. Magnetic separation of the various silicon carbide materials is effective in the method of the present invention because the lower grade silicon carbide forms in the cooler, outer regions of the furnace where the ferromagnetic material condenses.

The amount of iron in SiC particles of varying magnetic attraction to a hand magnet has been determined to be:

| | |
|---|---|
| <.3% Fe | non-magnetic |
| .3–.6% Fe | weakly magnetic |
| .6–1.25% Fe | intermediate magnetic |
| >1.25% Fe | strongly magnetic |

A magnet with a stronger field intensity will attract SiC particules containing less than the 0.3% iron shown here.

A preferred method of preparing and isolating first grade silicon carbide is shown in the schematic representation of FIG. 4:

(1) Admixing the ferromagnetic source, carbon source, and silicon cource to form a mix 23;

(2) Forming a silicon carbide furnace product 24 by means, common to the art;

(3) Crushing 30 the silicon carbide furnace product to minus 6 mesh (less than 4 millimeters);

(4) Magnetically separating the lower grade silicon carbide particles 44 from the first grade silicon carbide crystals 58 (FIG. 4 shows three magnetic separation stages; first stage 42, second stage 48, and third stage 56).

A comparison of the process as illustrated in FIG. 4 with that of applicants' copending application Ser. No. 721,761 filed Apr. 14, 1985 reveals that this invention employs 2 less steps, i.e. the mixing of the crushed material with the ferromagnetic powder and the sifting step. This reduction in operative steps gives a corresponding reduction in capital investment for machinery.

The invention is further illustrated by the following non-limiting examples:

EXAMPLE 1

If fine particles (6/14 mesh or finer) of conventional green SiC are passed over a rare earth belt magnetic separation apparatus, less than 1% of the material will be collected in the tails (magnetic fraction) and the contaminant content (cc) will not be satisfactorily reduced. The contaminant content is determine visually on a binocular microscope at 10× to 50× depending on the mesh size of the sample. The contaminant particles are removed and weighed to determine the contaminant fraction. They include: (a) Agglomerates—mesh sized gross particles composed of numerous SiC crystals each approximately 250 microns or smaller; (b) Firesand—mesh sized gross particles composed of numerous SiC crystals much smaller than the SiC crystals in agglomerates (approximately 50 microns or smaller); (c) Crust—mesh sized gross particles composed of very small SiC particles each less than approximately 10 microns (these grit size materials appear amorphous at low magnifications); and (d) Cokeys—mesh sized particles of unreacted coke.

To illustrate the foregoing, the crushed material from a conventional cylinder was twice passed over a rare earth belt magnetic separation apparatus. It was found that the magnetically separated material was composed primarily of particles from the inner side of zone 2 (agglomerates) where the iron is concentrated. This is illustrated by the decrease in the agglomerates in the concentrate fraction shown below. The outer section of zone 2 (firesand) and zone 3 (crust) are not sufficiently magnetic and are not significantly removed from the feed material as shown in the following table.

| Magnet Passes | Cumulative Yield | CC = | Concentrate Total | | |
|---|---|---|---|---|---|
| | | | Agglomerates + | Firesand + | Crust |
| 0 | 100.00 | 26.01 | 15.68 | 5.86 | 4.47 |
| 1 | 83.70 | 18.46 | 10.04 | 4.32 | 4.10 |
| 2 | 77.35 | 13.92 | 6.37 | 4.00 | 3.55 |

As shown above, the total contaminant content (cc) was 13.92% after 2 magnet passes.

EXAMPLE 2

In a test representative of the present invention, 100 mesh ferrosilicon (78% iron, 15% silicon, 5% titanium, 2% aluminum) was added to Acheson Furnace mixes at 2 levels: 0.25 and 0.50% contained iron. After furnacing, representative samples of crushed cylinder were passed over a rare earth belt magnetic separation apparatus twice and then the contaminant count was determined. Acceptable No. 1 Black SiC was separated from the samples of the cylinders having 0.25% and 0.50% contained iron additions. The contaminant contents were 1.14 and 0.10 respectively; the preferable allowable contaminant content is 2%.

Thus the technique of the present invention provided a much purer (lower cc) No. 1 Black product than could be obtained by applying magnetic separation to a conventional furnace product.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A method for producing silicon carbide and isolating a high grade fraction thereof, said process comprising the following steps:
   admixing a silicon source, a carbon source and a ferromagnetic element source;
   heating, from a central portion thereof, the admixture to a temperature sufficient to form a cylinder containing silicon carbide, with a temperature gradient being established between said central portion and outer portions of the admixture, whereby said ferromagnetic element migrates from said central portion toward the outer portions;
   cooling the cylinder;
   crushing the cylinder to form a particulate material; and
   magnetically separating a fraction of the particulate material and recovering the remainder as said high grade fraction.

2. A process in accordance with claim 1 wherein said silicon source is silica sand, the carbon source is crushed or powdered coal or coke and said ferromagnetic element is a particulate solid.

3. The method of claim 2 wherein the ferromagnetic element is contained in the silica sand.

4. A process in accordance with claim 1 wherein said ferromagnetic element is contained in a particulate solid selected from the group consisting of iron, iron compounds, iron alloys, nickel, nickel alloys, nickel compounds, cobalt, cobalt compounds, cobalt alloys and mixtures thereof.

5. A method in accordance with claim 1 wherein said ferromagnetic element is contained in an alloy comprising iron and silicon.

6. The method of claim 1 wherein said crushing provides a particulate material of minus 6 mesh or finer.

7. The method of claim 1 wherein said heating is by passing an electric current through the admixture and wherein the admixture is heated in an elongated trough with a pair of electrodes centrally located at opposite ends of the trough.

8. The method of claim 1 wherein said ferromagnetic element is derived from red mud.

9. The method of claim 1 wherein a sufficient amount of said ferromagnetic element is present in the feed to the heating step to provide at least 0.125 wt. % of said ferromagnetic element in said low grade fraction.

10. The method of claim 1 wherein a sufficient amount of said ferromagnetic element is present in the feed to the heating step to provide at least 0.25 wt. % of said ferromagnetic element in said low grade fraction.

11. The method of claim 1 wherein the rate of said heating is increased or decreased during the latter portion of the total heating time to change the pattern of condensation of the ferromagnetic elements.

* * * * *